US010531392B2

(12) United States Patent
Lee et al.

(10) Patent No.: US 10,531,392 B2
(45) Date of Patent: *Jan. 7, 2020

(54) METHOD AND APPARATUS FOR ADJUSTING BEAM WIDTH IN WIRELESS COMMUNICATION SYSTEM

(71) Applicant: Samsung Electronics Co., Ltd., Gyeonggi-do (KR)

(72) Inventors: Byung-Hwan Lee, Yongin-si (KR); Su-Ryong Jeong, Yongin-si (KR); Hyun-Kyu Yu, Suwon-si (KR); Jeong-Ho Park, Seoul (KR); Ji-Yun Seol, Seongnam-si (KR); Jae-Seung Son, Suwon-si (KR); Cheol Jeong, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 227 days.

This patent is subject to a terminal disclaimer.

(21) Appl. No.: 14/839,190

(22) Filed: Aug. 28, 2015

(65) Prior Publication Data

US 2016/0066279 A1    Mar. 3, 2016

(30) Foreign Application Priority Data

Aug. 29, 2014    (KR) .................... 10-2014-0113966

(51) Int. Cl.
*H04W 52/02*    (2009.01)
*H04L 5/00*    (2006.01)
(Continued)

(52) U.S. Cl.
CPC ...... *H04W 52/0261* (2013.01); *H04B 7/0617* (2013.01); *H04B 7/086* (2013.01);
(Continued)

(58) Field of Classification Search
None
See application file for complete search history.

(56) References Cited

U.S. PATENT DOCUMENTS 9,042,928 B2 * 5/2015 Park ............... H04B 7/0408
370/329
9,185,646 B2 * 11/2015 Li .................. H04W 52/0206
(Continued)

FOREIGN PATENT DOCUMENTS

KR    20130030404 A    3/2013
KR    20130100733 A    9/2013

*Primary Examiner* — Willie J Daniel, Jr.
(74) *Attorney, Agent, or Firm* — The Farrell Law Firm, P.C.

(57) ABSTRACT

The present disclosure relates to a pre-5th-generation (5G) or 5G communication system to be provided for supporting higher data rates beyond 4th-generation (4G) communication system such as long term evolution (LTE).

The method includes: receiving information on a battery threshold of a terminal from a base station; determining whether to use a reception beam width wider than a currently used reception beam width, by comparing a battery level of the terminal with the battery threshold; transmitting additional resource request information to the base station when it is determined that a wider reception beam width is used; and when an additional resource corresponding to the additional resource request information is allocated from the base station, blocking a power supply of at least one antenna reception circuit among multiple antenna reception circuits corresponding to multiple antenna elements in order to form at least one reception beam having the wide reception beam width.

18 Claims, 10 Drawing Sheets

(51) Int. Cl.
    *H04L 1/00*           (2006.01)
    *H04W 52/24*        (2009.01)
    *H04W 4/90*         (2018.01)
    *H04W 72/04*        (2009.01)
    *H04B 7/06*         (2006.01)
    *H04B 7/08*         (2006.01)
    *H04W 52/26*        (2009.01)

(52) U.S. Cl.
    CPC .......... *H04L 1/0002* (2013.01); *H04L 1/0003* (2013.01); *H04L 1/0026* (2013.01); *H04L 1/0036* (2013.01); *H04L 5/0007* (2013.01); *H04L 5/0057* (2013.01); *H04W 4/90* (2018.02); *H04W 52/24* (2013.01); *H04W 72/048* (2013.01); *H04W 52/265* (2013.01); *H04W 72/046* (2013.01); *Y02D 70/00* (2018.01); *Y02D 70/1262* (2018.01); *Y02D 70/21* (2018.01); *Y02D 70/444* (2018.01)

(56) References Cited

U.S. PATENT DOCUMENTS

| | | | |
|---|---|---|---|
| 9,478,857 B2* | 10/2016 | Chang | H01Q 1/246 |
| 9,882,622 B2* | 1/2018 | Jeong | H04B 7/0617 |
| 2014/0011543 A1* | 1/2014 | Li | H04W 52/0206 |
| | | | 455/561 |
| 2018/0152231 A1* | 5/2018 | Jeong | H01Q 3/34 |

\* cited by examiner

METHOD AND APPARATUS FOR ADJUSTING BEAM WIDTH IN WIRELESS COMMUNICATION SYSTEM

RELATED APPLICATION(S)

This application claims the priority under 35 U.S.C. § 119(a) to Korean Application Serial No. 10-2014-0113966, which was filed in the Korean Intellectual Property Office on Aug. 29, 2014, the entire content of which is hereby incorporated by reference.

BACKGROUND

The present disclosure relates to an apparatus and method for adjusting a beam width in a beam forming system using a multi-antenna.

To meet the demand for wireless data traffic having increased since deployment of 4G communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the conventional mobile communication technology, a use possibility of 60 GHz band (57~66 GHz) among millimeter Wave (mmWave) bands has grown in a scheme evolved for the next generation communication. In the mmWave band, even though a broadband can be used, it is difficult to prevent a path loss of a signal due to a high frequency. As a technology corresponding to this, a method of utilizing a beamforming technology is generally accepted.

An apparatus for participating in a mobile communication such as a base station or a terminal uses an array antenna (or, referred to as an antenna array and an array antenna) configured by multiple antenna elements in order to perform beam-forming. As needed, in a scheme for combining signals of a part of or all array antenna elements, a gain of the antenna can be increased. In the beam-forming technology, there are a digital beam-forming scheme, an analog beam-forming scheme, and a hybrid beam-forming scheme in which the two schemes are combined.

SUMMARY

The present disclosure provides a method of controlling an antenna reception circuit by a terminal when a base station additionally supports resources to the terminal.

The present disclosure provides a method of additionally supporting resources to a terminal by a base station.

The present disclosure provides a terminal apparatus for supporting a control of an antenna reception circuit when a base station additionally supports resources to the terminal apparatus.

The present disclosure provides a base station apparatus for additionally supporting resources to a terminal apparatus.

In accordance with an aspect of the present disclosure, a method of adjusting a reception beam width of a terminal in a wireless communication system. The method includes: receiving information on a battery threshold of a terminal from a base station; determining whether to use a reception beam width wider than a currently used reception beam width, by comparing a battery level of the terminal with the battery threshold; transmitting additional resource request information to the base station when it is determined that a wider reception beam width is used; and when an additional resource corresponding to the additional resource request information is allocated from the base station, blocking a power supply of at least one antenna reception circuit among multiple antenna reception circuits corresponding to multiple antenna elements in order to form at least one reception beam having the wider reception beam width.

In accordance with another aspect of the present disclosure, a method of supporting an adjustment of a reception beam of a terminal by a base station in a wireless communication system. The method includes: transmitting information on a battery threshold to a terminal; receiving additional resource request information from the terminal; and allocating an additional resource to the terminal in response to a reception of the additional resource request information, wherein the additional resource request information is transmitted from the terminal when a battery level of the terminal is lower or equal to the battery threshold, and the additional resource is allocated to support such that the terminal uses a reception beam width which is wider than a currently used reception beam width.

In accordance with another aspect of the present disclosure, a terminal apparatus for adjusting a reception beam width in a wireless communication system. The terminal apparatus includes: a reception unit that receives information on a battery threshold of a terminal from a base station; a transmission unit that transmits additional resource request information to the base station when it is determined that a wide reception beam is used; and a controller that determines whether to use a reception beam wider than a currently used reception beam width, by comparing a battery level of the terminal and the battery threshold, and when an additional resource corresponding to the additional resource request information is allocated from the base station, blocks a power supply of at least one antenna reception circuit among multiple antenna reception circuits corresponding to multiple antenna elements in order to form at least one reception beam having the wider reception beam width.

In accordance with another aspect of the present disclosure, a base station for supporting an adjustment of a reception beam width of a terminal in a wireless communication system. The base station includes: a transmission unit that transmits information on a battery threshold to a terminal; a reception unit that receives additional resource request information from the terminal; and a controller that allocates an additional resource to the terminal in response to a reception of the additional resource request information, wherein the additional resource request information is transmitted from the terminal when a battery level of the terminal is lower or equal to the battery threshold, and the additional resource is allocated to support that the terminal uses a reception beam width which is wider than a currently used reception beam width.

According to the present disclosure, a terminal may reduce power consumption by additionally receiving idle resources or/and idle power of a base station. Further, according to the present disclosure, since the base station uses a wide beam width, a reception range of the terminal increases so that cell coverage can increase. In addition, a reception beam of a high speed mobile terminal, in which a channel rapidly changes, becomes to be stabilized.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, the detailed description described below will present representative embodiments of the present disclosure in order to solve the foregoing technical problems. In the following description of the present disclosure, a detailed description of known configurations or functions incorporated herein will be omitted when it is determined that the detailed description may make the subject matter of the present disclosure unclear. Meanwhile, terms described later are defined in consideration of the functions of the present disclosure, but the meaning of the terms may be changed according to a user, intention of an operator, or convention. Accordingly, the definitions of the terms should be made based on the overall context of the embodiments.

A technology related to beam forming includes technologies by which a base station and a terminal search for an optimal beam (or a beam combination) for transmission and reception. As an example of the technology related to the beam forming, a method for improving a quality of a signal received by the terminal includes a technology by which a beam is configured by applying characteristics of a reception channel or a beam width is converted into a wide beam or a narrow beam according to a kind of received signal and then is used.

Figure 1:
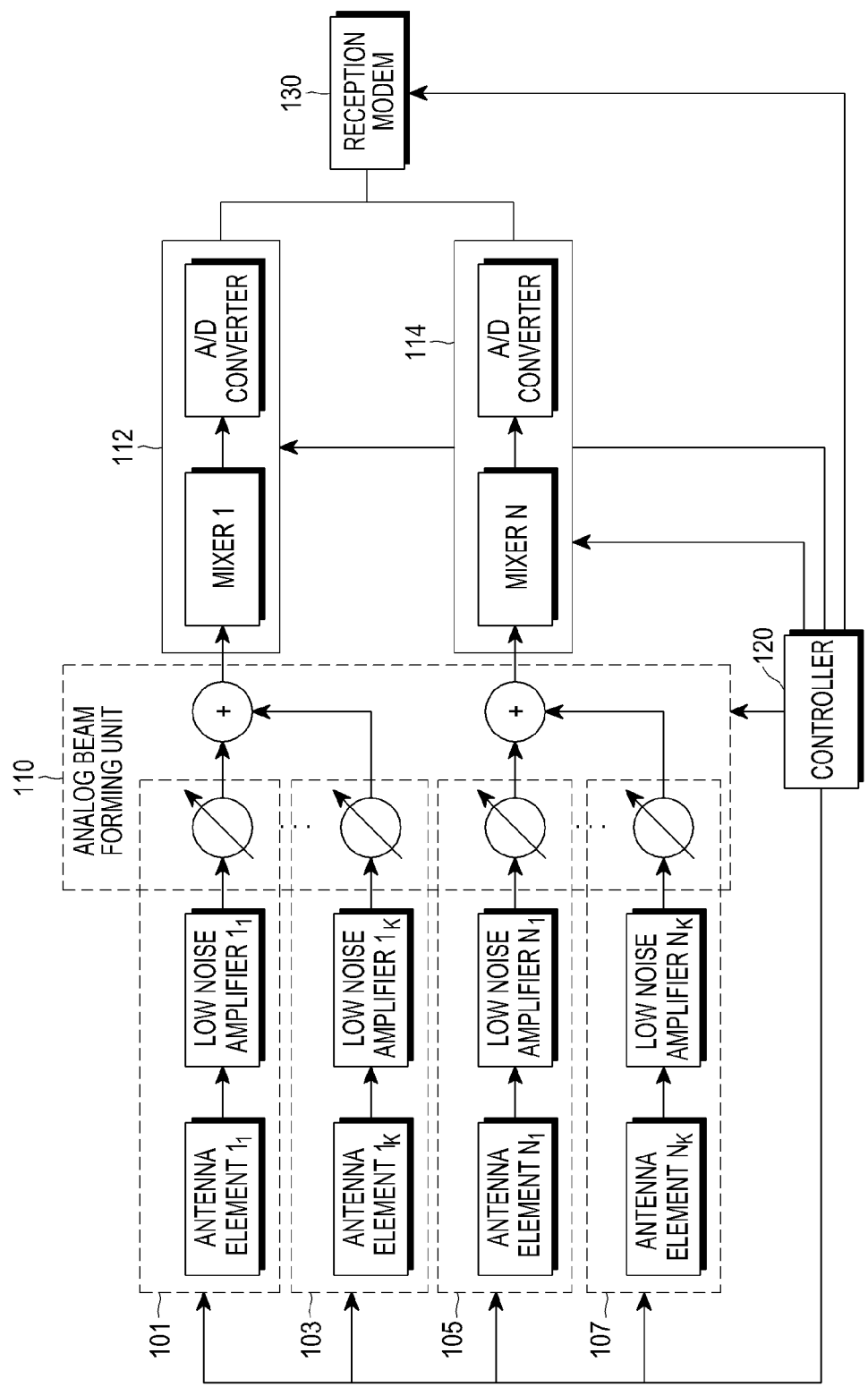
FIG. 1 illustrates an example of a configuration of a reception apparatus having an array antenna according to an embodiment of the present disclosure.

FIG. 1 illustrates an example of a configuration of a reception apparatus having an array antenna according to an embodiment of the present disclosure. The reception apparatus may be a reception circuit of a downlink terminal as an example.

Referring to FIG. 1, a reception apparatus 100 may include a plurality of antenna reception circuits 101, 103, 105, and 107, an analog beam forming unit 110, a plurality of radio frequency (RF) paths 112 and 114, a controller 120, and a reception modem 130. N*K antenna reception circuits 101, 103, 105, and 107 corresponding to N*K antenna elements include antenna elements and a low noise amplifier (LNA), respectively. N*K antenna elements form the array antenna.

The analog beam forming unit 110 includes a phase shifter which can change a phase of a reception signal processed through each antenna reception circuit, and one or multiple combiners which combine reception signals of one or multiple antenna reception circuits. The N RF paths 112 and 114 corresponding to N combiners of the analog beam forming unit 110 include a mixer (or a frequency down converter) which converts an RF signal output from each combiner of the analog beam forming unit 110 into a baseband signal and an analog-to-digital (A/D) converter. The controller 120 controls whether power supply is applied to antenna reception circuits 101, 103, 105 and 107, and the reception modem 130 performs a modulation of a digitized reception signal.

The power supply is applied to the antenna reception circuits 101, 103, 105 and 107 corresponding to all antenna elements of the array antenna so that the reception apparatus 100 can make a beam width be narrow and thus raise gains of the reception signal.

Figure 2:
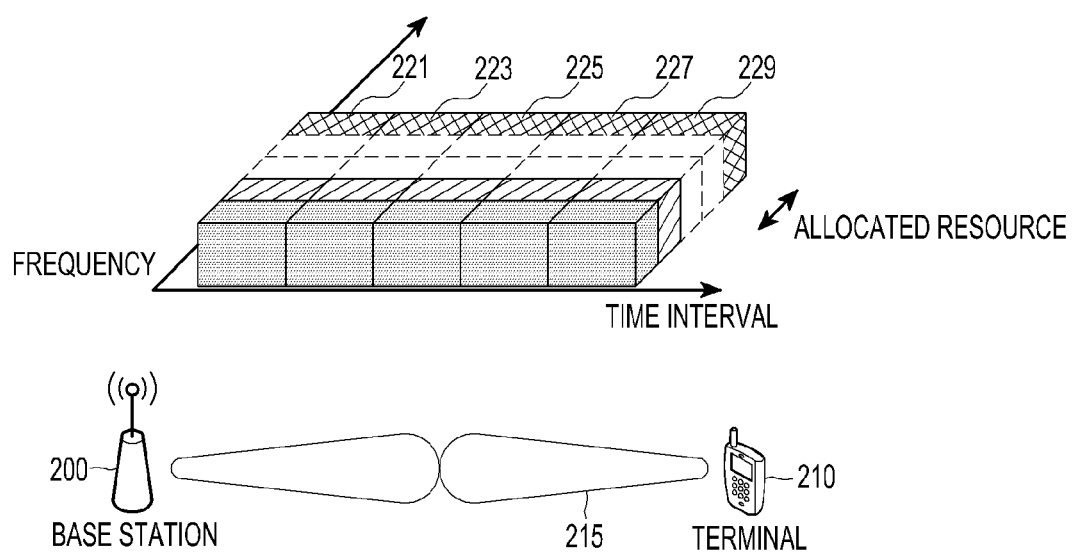
FIG. 2 illustrates resource allocation to a terminal by a base station using a narrow beam width.

FIG. 2 illustrates resource allocation by a base station to a terminal using a narrow beam width.

Specifically, FIG. 2 illustrates time-frequency resources 221, 223, 225, 227, and 229 allocated to a terminal 210 by a base station 200 when the terminal 210 forms a narrow beam width 215 and then communicates with the base station 200.

When the terminal is to reduce battery consumption, the terminal may block a power supply (or may not supply a power) of a part of an antenna reception circuit(s) for a reception of a downlink signal. By a part of the reception circuit in which the power supply is blocked, a reception beam having a wide beam width is formed but power consumption of the terminal is reduced. In this regard, it will be described in detailed using FIGS. 3 and 4 below.

Hereinafter, blocking a power supply of a part of an antenna reception circuit by a terminal, receiving a signal by forming a beam having a wide beam width by the terminal, and receiving a signal by lowering reception gains by the terminal may be interpreted to have the same meaning as a method of reducing power consumption by the terminal, but it is not limited thereto. Further, hereinafter, the beam width and the reception gain may be interpreted to be in a trade-off relationship. That is, if the beam width is wide, a reception gain decreases, and if the beam width is narrow, the reception gain increases.

Figure 3:
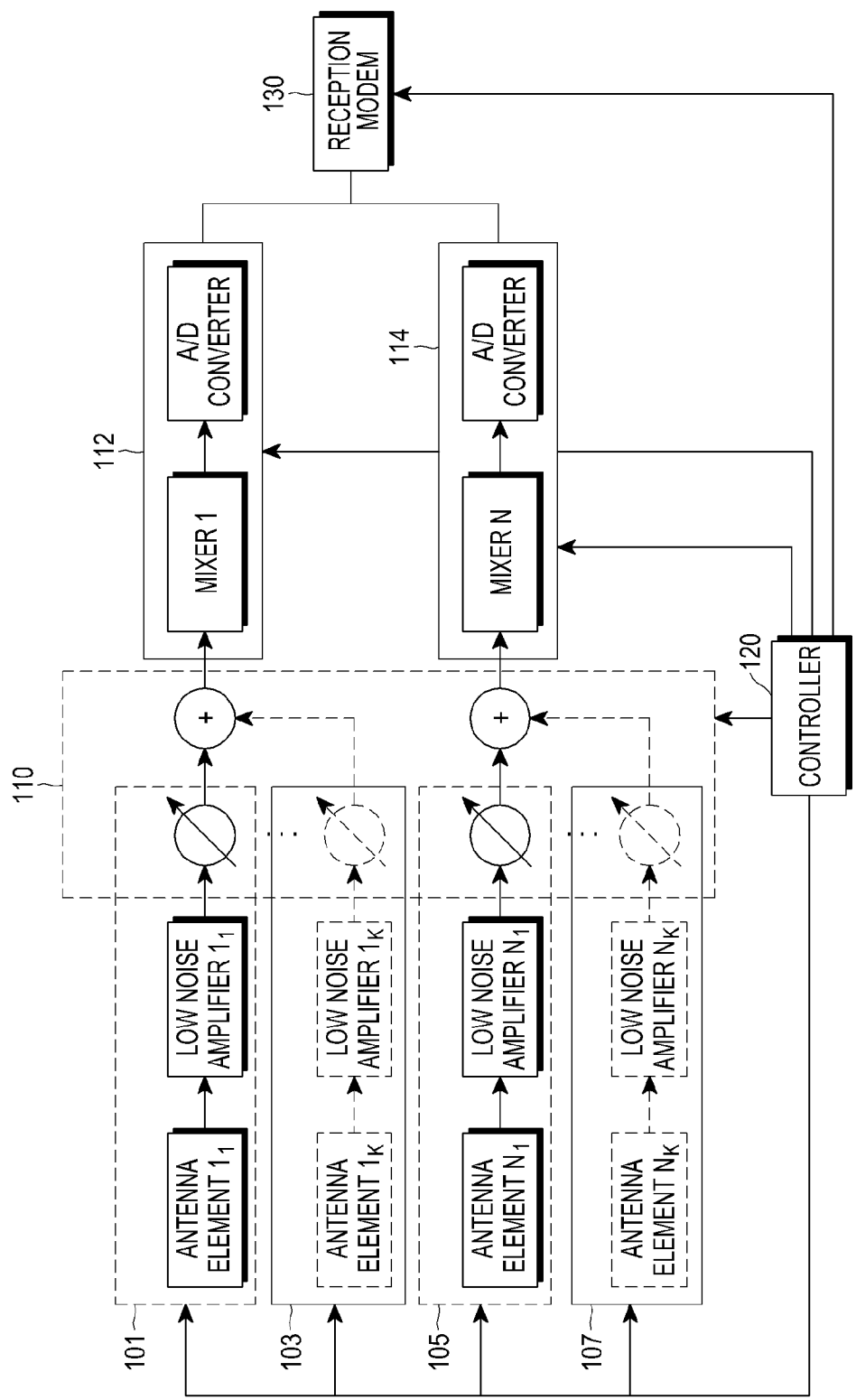
FIG. 3 illustrates an example of controlling a reception circuit having an array antenna according to an embodiment of the present disclosure.

FIG. 3 illustrates an example of controlling a reception circuit having an array antenna according to an embodiment of the present disclosure.

Specifically, FIG. 3 illustrates that a terminal in FIG. 2 blocks a power supply of a part of an antenna reception circuit to reduce battery consumption.

Referring to FIG. 3, the controller 120 blocks the power supply to circuits 103 and 107 among the antenna reception circuits 101, 103, 105, and 107 according to a predetermined condition so that the amount of battery consumption of the terminal can be reduced.

In this event, since a beam can be received by only the antenna reception circuits 101 and 105, a beam width which can be received by the terminal may be wide. However, the reception gain of the terminal may be decreased. Therefore, the terminal may additionally request a resource from the base station before controlling the antenna reception circuits, in order to continuously receive a signal having a good quality.

Figure 4:
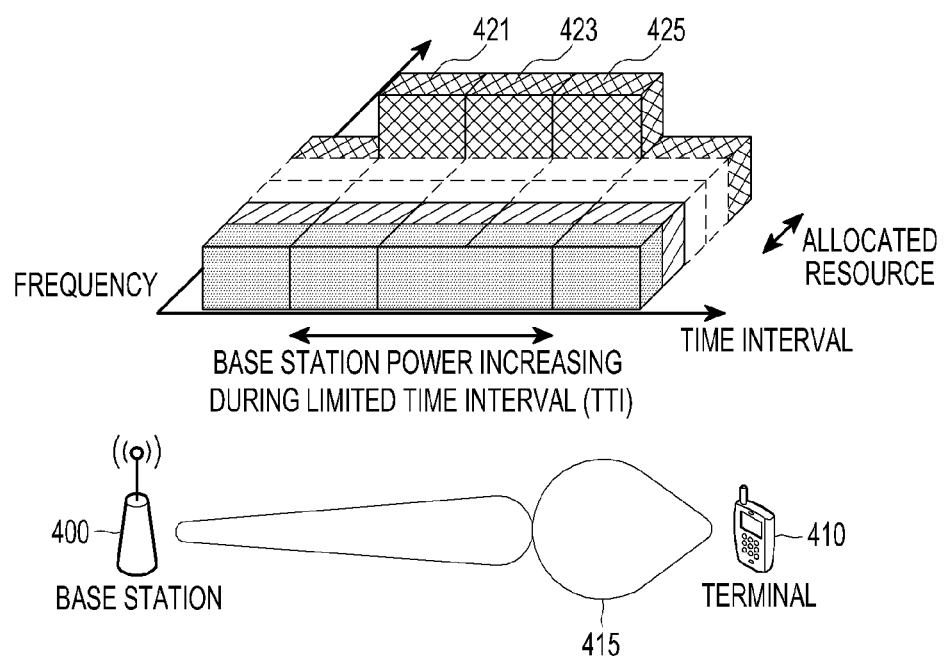
FIG. 4 illustrates resource allocation by a base station to a terminal using a wide beam width.

FIG. 4 illustrates resource allocation by a base station to a terminal using a wide beam width.

A terminal 410 blocks (in reference with FIG. 3) a power supply to a part of an antenna reception circuit in order to reduce the amount of battery consumption so that a reception beam 415, in which a reception gain is low in comparison with FIG. 2 and a beam width is wide, is formed, thereby communicating with a base station 400. Although the reception gain is low, the terminal 410 may additionally request a resource from or transmit an additional resource request to the base station 400 in order to have an identical performance. In order to provide the reception gain for the terminal 410, the base station 400 allocates additional time-frequency resources 421, 423, and 425 and/or a power during at least a limited time interval and then transmits a signal.

The base station 400 may broadcast a battery threshold value, or a battery threshold, which is a reference value for the amount of the battery charging provided to support a terminal which has an insufficient amount of the battery charging, as system information to the terminal 410 such that the terminal 410 can turn off a power supply of a part of an antenna reception circuit in order to reduce the amount of battery consumption.

The base station 400 may support a terminal (e.g., the terminal 410) which has a battery level lower than or equal to the battery threshold, or may support only a terminal which has the lower battery level. An accurate operating method for the battery threshold may be changed according to a configuration (e.g., a policy of operators, an idle resource of a base station, or the like).

In an embodiment below, the base station 400 supports a terminal which has a battery level lower than or equal to a battery threshold will be described. However, it should be noted that this embodiment is also applicable when the base station supports only a terminal which has a battery level lower than the battery threshold.

When a battery level, or an amount of remaining charges, is lower than or equal to a battery threshold included in the system information, power supplies of one or more antenna reception circuits can be turned off. Due to the antenna reception circuits that the power supply is blocked, a reception beam of the terminal has a wide beam width and a low reception gain. The terminal may request an additional resource or a power (e.g., a power gain of an antenna, and additional allocation of time and/or frequency) from the base station in order to compensate for a reduced reception gain. The base station may additionally allocate a resource or a power according to the determination of the base station with respect to the resource or power request of the terminal.

Further, the base station may adaptively adjust the battery threshold broadcasted to a terminal depending on a loading situation (i.e., a load) of the base station. For example, when it is determined that a loading state of the base station is high, the base station may include and broadcast a relatively low battery threshold in system information. That is, the base station may downwardly adjust a loading level of the base station by statistically reducing the number of terminals to be supported by the base station. On the contrary, when it is determined that the loading state of the base station is low, the base station includes and broadcasts a relatively high battery threshold in the system information, thereby statistically increasing the number of terminals to be supported by the base station. Therefore, the loading state of the base station may be constantly maintained.

In another embodiment, the base station may allocate an additional resource or power with respect to all terminals requesting the additional resource or power. In another embodiment, the base station may determine whether it is possible to support, to a terminal requesting the additional resource or power to a low power consumption for the terminal. In another embodiment, the base station may allow additional resource or power allocation for low power consumption support with respect to only a terminal which is under a contract for the low power consumption support with a service provider.

Figure 5:
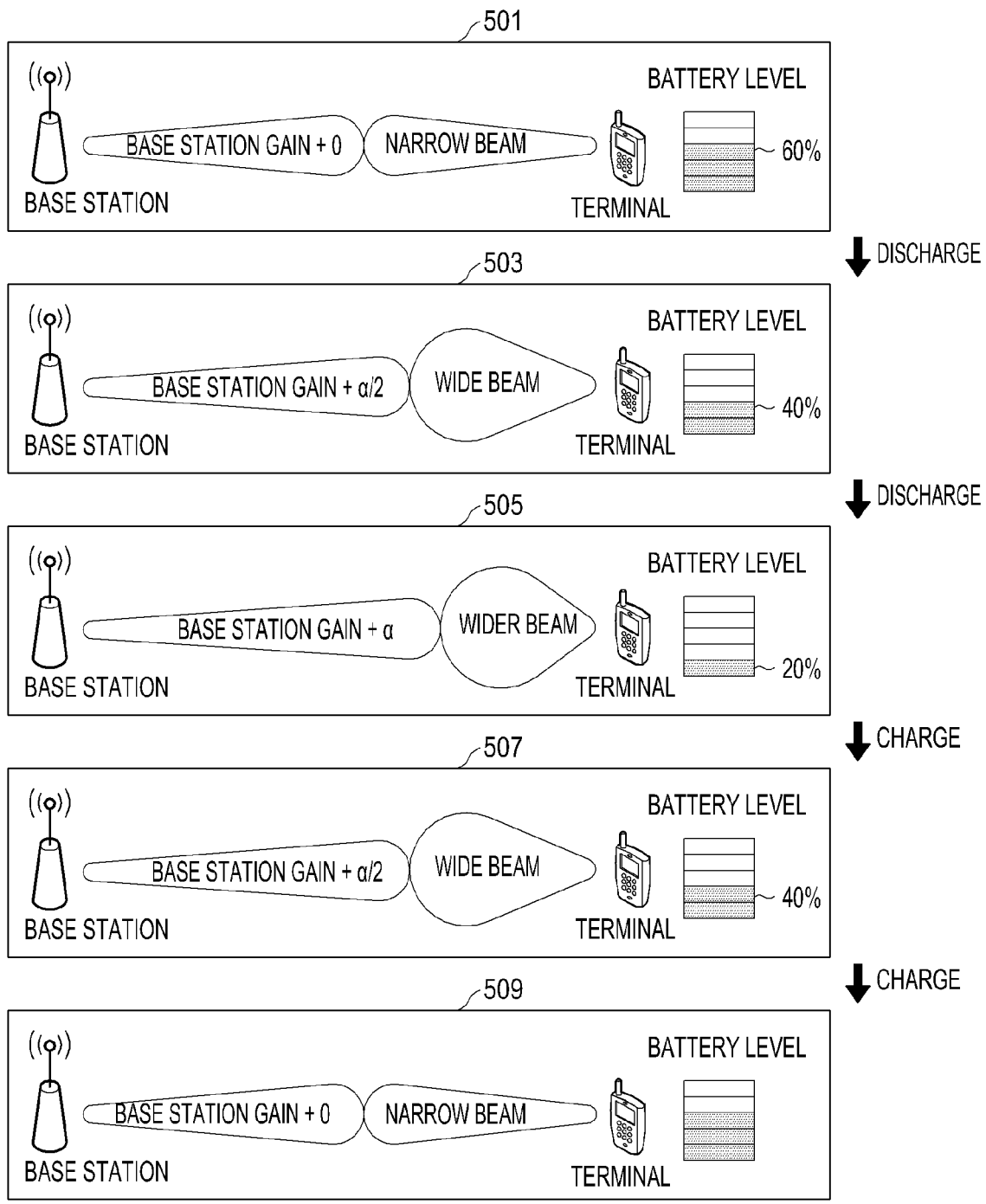
FIG. 5 illustrates a change of a resource which a base station allocates according to a battery level of the terminal according to an embodiment of the present disclosure.

FIG. 5 illustrates a change of a resource which a base station allocates to a terminal according to a battery level of the terminal according to an embodiment of the present disclosure. As shown in the embodiment, it is assumed that a battery threshold of a terminal broadcasted as system information by a base station to be about 40%.

Referring to FIG. 5, in situation 501, a base station may transmit a signal as a base station gain configured by given elements (e.g., elements for superlatively improving a quality of a signal received by a terminal). In situation 501, since the terminal has a relatively high battery level of about 60%, power supplies of almost all antenna reception circuits are turned on so that the terminal can receive a beam of which a beam width is narrow but a reception gain is high.

Situation 503 illustrates that a battery level of the terminal decreases to about 40% due to a user's use of a terminal. The battery level of 40% corresponds to a battery threshold which the base station broadcasts, as the system information, to additionally support a resource (i.e., a low power consumption support). Therefore, the terminal may request a low power consumption support to the base station. When an evaluation for the terminal and/or a load state of the base station corresponds to a case in which it is allowed that a resource or a power is supported to the terminal, the base station transmits a signal adding an additional gain ($\alpha/2$) more than a pre-configured base station gain. Therefore, even though the terminal reduces power consumption in comparison with situation 501, the terminal can continuously receive a good quality of signal due to the additional gain of the base station. However, when the terminal and the base station do not explicitly exchange a feedback, the terminal may not obtain the additional gain according to the determination of the base station.

Situation 505 illustrates that the battery level of the terminal further decreases to 20%. The terminal additionally blocks a power supply of a part of antenna reception circuit and request more low power consumption resources to the base station, in order to increasingly reduce the power consumption. When an evaluation for the terminal and/or a load state of the base station corresponds to a case in which support of a resource or a power is allowed to the terminal, the base station transmits a signal adding an additional gain (α) other than a pre-configured base station gain. The terminal can receive the signal even though the reception gain uses a lower beam in comparison with situation 503.

Situation 507 corresponds to a case in which the battery level increases to 40% due to charging of the terminal. The terminal may request a low power consumption support corresponding to the base station gain (α/2) which is lower than situation 505, in order to enable the base station to support other terminals.

Situation 509 corresponds to a case in which the terminal is further charged so that the battery level becomes larger than a battery threshold. The terminal may form a narrow beam (i.e., a beam having a high reception gain) and receive a signal of the base station using all antenna reception circuits even without the additional support of the base station.

As described above, the terminal can sequentially block (i.e., disable) power supply of one or more antenna reception circuits by receiving a support of the base station as the battery level is lowered. Then, as the battery level gets higher by charging, a power supply is integrally or sequentially applied (i.e., enabled) to the one or more antenna reception circuits.

Figure 6:
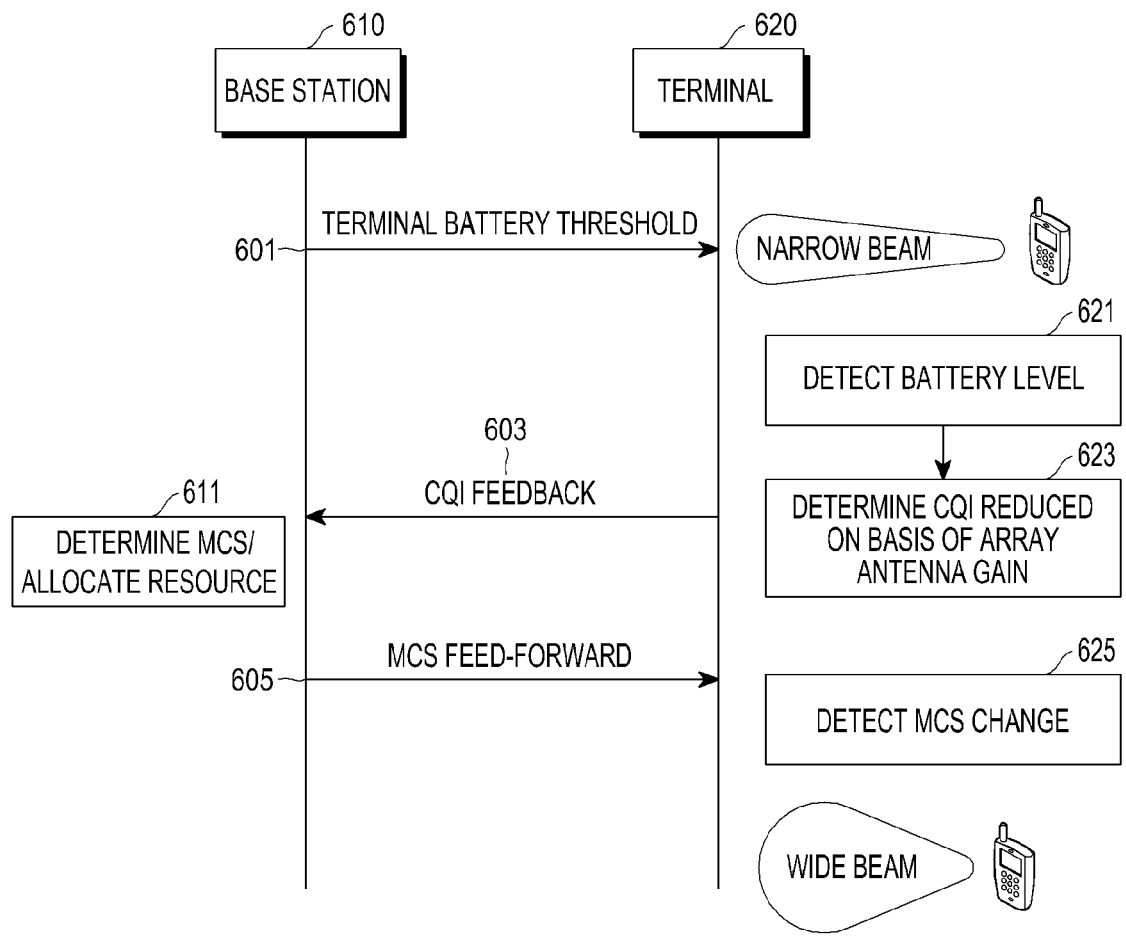
FIG. 6 illustrates an operation of adjusting a beam width suggestively according to an embodiment of the present disclosure.

FIG. 6 illustrates an operation of adjusting a beam width suggestively according to an embodiment of the present disclosure. That is, when it is notified to the terminal whether the base station supports a low power support mode, the terminal determines whether the terminal requests the mode by itself, and reflects the determination in information to be sent to the base station to transmit the information to the base station. Therefore, the base station may not identify whether the terminal requests the mode.

Referring to FIG. 6, in step 601, a base station 610 broadcasts a battery threshold for terminals in a cell through system information. When it is determined that the base station 610 has an idle resource and/or idle power which can support the mode for the terminals in the cell or terminals in which a low power support mode is allowed, the base station 610 may provide the battery threshold to the terminals. In another embodiment, the base station may provide a battery threshold to only a terminal subscribed to the low power support mode as the additional service, or the base station may broadcast the battery threshold to all terminals but allow a support request to only a terminal authorized by an operator.

In step 621, a terminal 620 detects or determines whether a battery level of the terminal 620 is larger than the battery threshold. When the battery level of the terminal 620 is not larger than the battery threshold, in step 623, the terminal 620 calculates an array antenna gain required to convert a beam into a beam having a wide beam width by considering a current power consumption and the battery threshold, and adjusts a channel quality indicator (CQI) to be requested to the base station according to the calculated array antenna gain. That is, the terminal 620 measures a quality of a reception channel with the base station 610 to determine the CQI, and reduces the determined CQI by a predetermined value according to an array antenna gain which is calculated to be required so that the base station 610 may allocate an additional resource and/or power. When the battery level is larger than the battery threshold, the terminal 620 determines that a low power consumption support of the base station 610 is not required and thus does not adjust a CQI determined from a quality of a reception channel.

In step 603, the terminal 620 feedbacks the adjusted CQI or the CQI which is not adjusted to the base station 610. In step 611, the base station 610 determines a modulation and coding scheme (MCS) index indicating the MCS for the terminal 620 by identifying the fed back CQI, and allocates a resource for the terminal 620. In step 605, the base station 610 feeds-forward information on the determined MCS index and the allocated resource to the terminal 620.

In step 625, the terminal 620 configures a reception beam according to the received MCS index. In an embodiment, the terminal 620 compares the MCS index corresponding to an actually measured CQI in step 623 with the MCS index received from the base station 610. Further, when the MCS index received from the base station 610 is higher than the MCS index corresponding to the actual CQI, the terminal 620 may determine that a wide beam can be used. When it is determined that the terminal 620 can use the wide beam, the terminal 620 may block a power supply of at least a part of an antenna reception circuit, thereby reducing the power consumption.

The base station 610 may identify a CQI fed back by the terminal 620 and allocate a resource which the terminal 620 requests regardless of whether the CQI fed back by the terminal 620 has been adjusted. When the terminal 620 feeds back the adjusted CQI and the base station 610 has an idle resource, the amount of resources allocated to the terminal 620 becomes larger than the amount of resources corresponding to the CQI which is not adjusted. Further, since the lower MCS index is allocated to the terminal 620 by a lowered CQI feedback. Therefore, a signal received by the terminal 620 obtains a reception gain by the amount corresponding to a difference of the CQIs.

Figure 7:
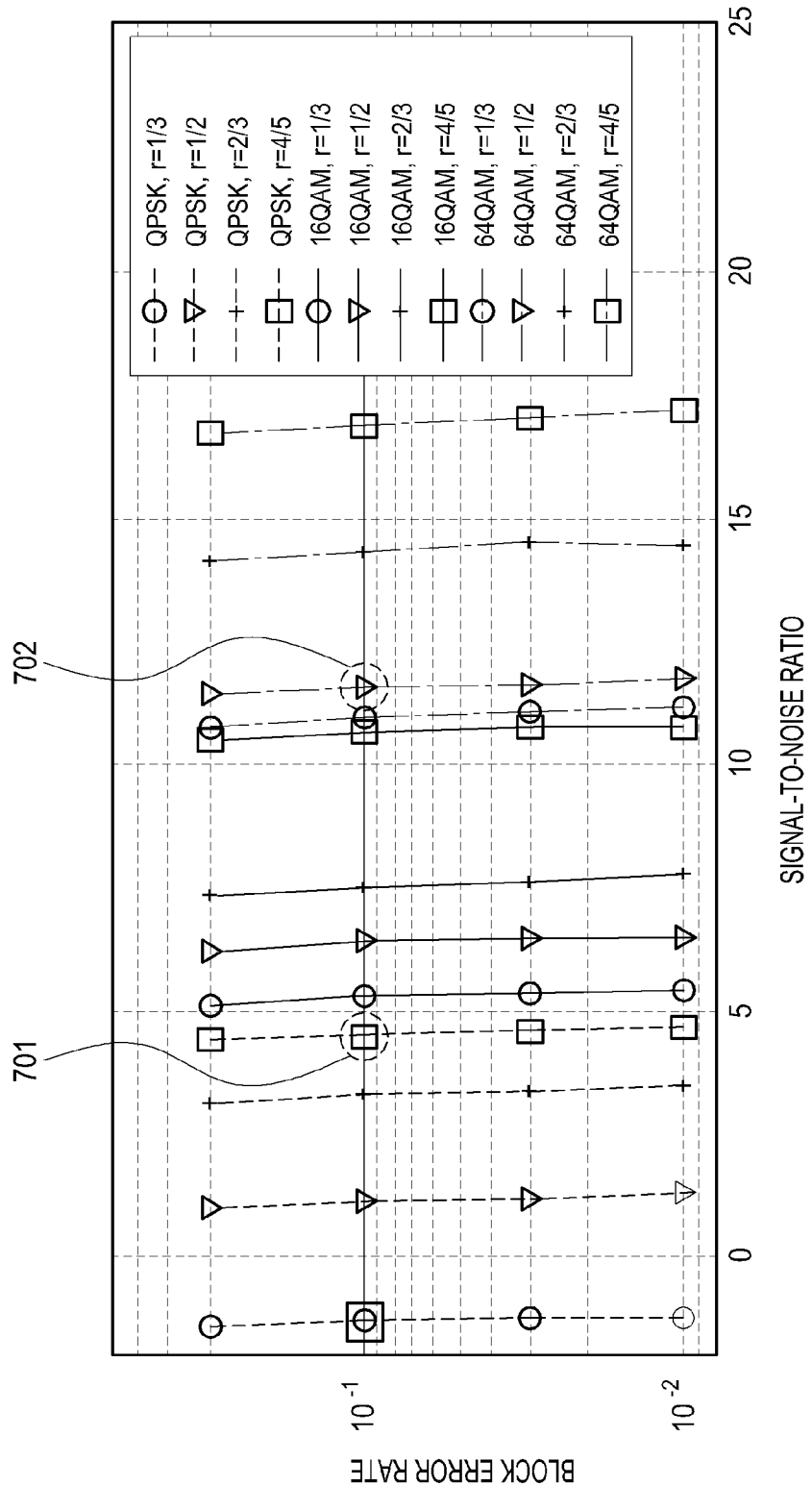
FIG. 7 illustrates a block error rate versus a signal-to-noise ratio for a modulation and coding scheme.

FIG. 7 illustrates a block error rate (BLER) versus a signal-to-noise ratio (SNR) for a modulation and coding scheme.

As shown in FIG. 7, it can be known that the SNR versus the BLER changes according to a modulation and coding scheme applied to a signal, i.e., the MCS. The MCS of a signal transmitted to a downlink is determined according to a CQI which a terminal reports to a base station. A terminal required for the low power consumption support subtracts a value corresponding to an array antenna gain required to reduce power consumption from a current measured SNR to determine a goal SNR, and then selects a CQI corresponding to the goal SNR as the feedback information. The CQI corresponding to the goal SNR may be determined as an example in FIG. 7.

For a specific example, according to the current measured SNR, the terminal determines an MCS index 701 of a quadrature phase shift keying (QPSK) modulation scheme and a 4/5 code rate (r). However, when the support of the base station is required because the battery level of the terminal is insufficient, the terminal may determine that, instead of the MCS index 701, an MCS index 702 of a 64-ary quadrature amplitude modulation (64QAM) and a 1/2 code rate (r) may be needed. Then, the terminal determines a CQI index corresponding to the MCS index 702 and feeds back the CQI index to the base station. The CQI index corresponding to the MCS index may be determined according to a predetermined appointment between the terminal and the base station, e.g., a table such as Table 1 below.

Through the operations, a terminal in a low power state feeds back a CQI index 11 corresponding to the MCS index 702 of the 64QAM modulation scheme and the 1/2 code rate (r), instead of a CQI index 6 corresponding to the MCS index 701 of the QPSK modulation scheme and the 4/5 code rate (r).

TABLE 1

| CQI index | Modulation scheme | Code rate (x1024) | Efficiency |
|---|---|---|---|
| 0 | Out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The base station allocates a resource to the terminal according to the CQI feedback of the terminal and determines an MCS for the resource, and then notifies of the determination to the terminal. The terminal identifies a difference (or a difference of the SNRs corresponding to this) between a CQI corresponding to the notified MCS and a CQI corresponding to a previously and actually measured SNR such that power supplies of the number of antenna reception circuits equal to the difference are blocked, thereby reducing the power consumption.

In order to identify the difference between the CQI corresponding to the MCS notified of by the base station and the CQI corresponding to the previously and actually measured SNR, the terminal decides on a modulation scheme and a transport block size (TBS) from the MCS index notified of by the base station, and determines the degree of SNR, which the modulation scheme and the TBS correspond to. A graph in FIG. 7 may be used as an example for calculating the modulation scheme and the SNR corresponding to the code rate. Further, a previously determined appointment between the terminal and the base station, e.g., a mapping rule such as Table 2 may be used to determine the modulation scheme and TBS corresponding to the MCS index. Table 2 shows a mapping rule between a modulation order corresponding to an MCS index, which can applied to a physical downlink shared channel (PDSCH), and a TBS index. When the terminal determines the TBS index corresponding to the MCS notified of by the base station and receives a notification of NPRB which is the number of physical resource blocks (PRBs) to be used for a transmission of a downlink signal, the base station can identify the TBS used for the transmission of the downlink signal by the base station, using a TBS table such as Table 3.

Finally, the terminal determines whether power supply of a part of antenna reception circuits is maintained or how many antenna reception circuits are maintained, using a difference between an SNR corresponding to a CQI reported to the base station and a SNR corresponding to an MCS index notified of by the base station.

TABLE 2

| MCS index | modulation order | TBS (transport block size) index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 6 | reserved |
| 30 | 4 | |
| 31 | 6 | |

TABLE 3

| TBS index | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |

TABLE 3-continued

| TBS index | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |

Figure 8:
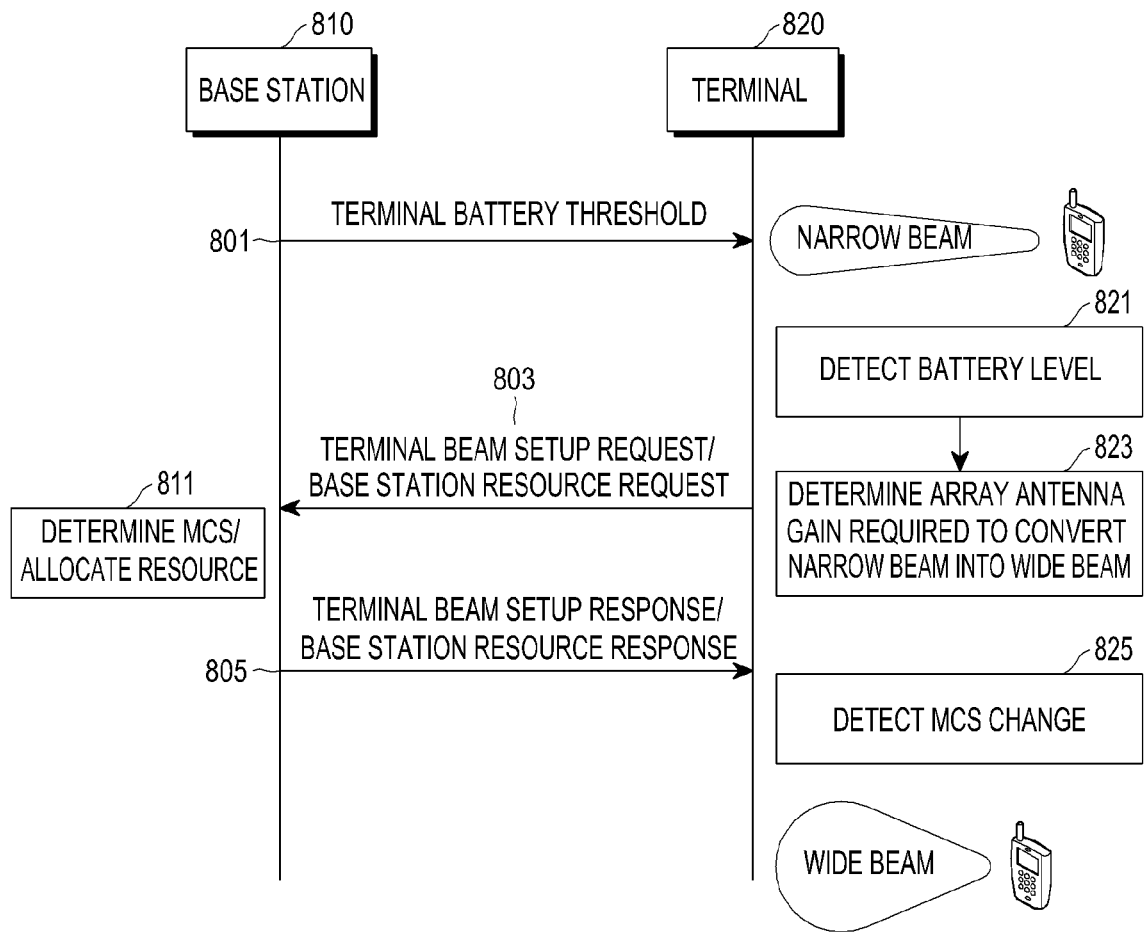
FIG. 8 illustrates an operation of adjusting a beam width explicitly according to an embodiment of the present disclosure.

FIG. 8 illustrates an operation of adjusting a beam width explicitly which exchanges a feedback for resource allocation by a terminal and a base station according to an embodiment of the present disclosure.

In step 801, a base station 810 broadcasts a battery threshold of a terminal as at least a portion of system information. In step 821, a terminal 820 detects whether a battery level of the terminal 820 is larger than the battery threshold. In step 823, when the detected battery level is lower than or equal to the battery threshold, the terminal 820 calculates an array antenna gain required to convert a narrow beam into a wide beam by considering a power consumption of the terminal 820 and the battery threshold. However, when the detected battery level is larger than the battery threshold, the terminal 820 may not request a support of an additional resource of the base station 810.

In step 803, the terminal 820 transmits, to the base station 810, a message for requesting a beam setup of the terminal and a resource of the base station 810 based on the adjusted gain. As an example, the message may include at least one among an indicator (in this event, the base station determines whether to support a resource or a power) indicating that the terminal requires a low power consumption support (or an additional resource for this), a gain value (e.g., a value of a dB unit) which the terminal additionally requires for the low power consumption support, and an amount of resources additionally required by the terminal for the low power consumption support (e.g., a number of resource blocks (RBs)). In step 811, the base station 810 determines the MCS for the terminal by considering the required array antenna gain in response to the message, and allocates the resources. Specifically, the base station 810 determines the MCS and resources for the terminal 820 based on the required array antenna gain and a load and other parameters of the base station 810, and adjusts the determined MCS and resource in order to support the low power consumption resource support of the terminal 820. The base station 810 may allocate a value obtained by adding an offset value for guaranteeing or providing an additional reception gain of the terminal to the MCS index determined for the terminal 820. Further, the base station 810 may allocate a value obtained by adding an offset value for guaranteeing or providing an additional reception gain of the terminal to the number of RBs determined for the terminal 820. The additional reception gain refers to a gain required to convert a current reception beam into a wide beam.

In step 805, the base station 810 responds to the determined MCS and resource with the terminal 820. The base station 810 receiving a resource allocation request for adjusting a beam width of the terminal 820 may notify an MCS index, which is lowered to supplement the array antenna gain instead of allocating the resource required by the terminal 820, to the terminal 820. The base station 810 notifies of a gain lowered according to the additional resource allocation to the terminal 820 so that the terminal 820 may identify a gain obtained from the base station 810. In this event, a gain notified of by the base station 810 may be a value of a dB unit. In step 825, since the gain notified of by the base station 810 can be different from a gain requested to the base station 810 by the terminal 820, the terminal 820 may determine how long power supplies of antenna reception circuits of the terminal 820 are maintained through the gain notified of by the base station 810.

Figure 9:
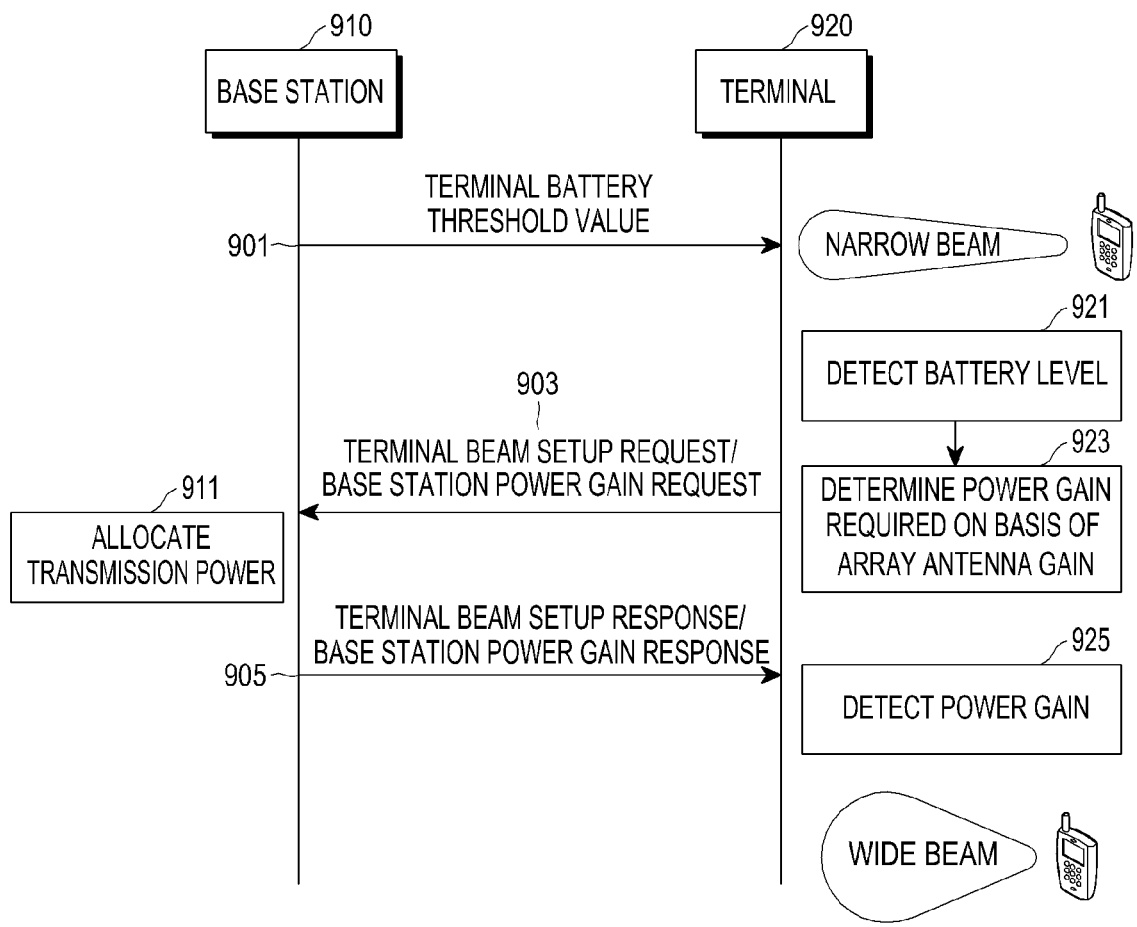
FIG. 9 illustrates a method of adjusting a beam width explicitly which exchanges a feedback for resource allocation by a terminal and a base station according to an embodiment of the present disclosure.

FIG. 9 illustrates a method of adjusting abeam width explicitly which exchanges a feedback for resource allocation by a terminal and a base station according to an embodiment of the present disclosure.

In step 901, a base station 910 broadcasts a battery threshold of a terminal as system information. In step 921, a terminal 920 detects whether a battery level of the terminal 920 is larger than the battery threshold. In step 923, when the detected battery level is lower than or equal to the battery threshold, the terminal 920 calculates an array antenna gain required to convert a narrow beam into a wide beam by considering a power consumption of the terminal 920 and the battery threshold, and determines a power gain (i.e., a power) to be requested to the base station according to the calculated array antenna gain. However, when the detected battery level is larger than the battery threshold, the terminal 920 may not request a support of an additional resource of the base station 910.

In step 903, the terminal 920 transmits a message for requesting a beam setup of the terminal and a resource of the base station 910 based on the determined power gain, to the base station 910. As an example, the message may include at least one among an indicator (in this event, the base station determines whether to support a resource or a power) indicating that the terminal requires for a low power consumption support, a power gain value (e.g., dB) which the terminal additionally requires the low power consumption support, and the amount (e.g., the number of RBs) of resources additionally required by the terminal for the low power consumption support. In step 911, the base station 910 allocates a transmission power for the terminal in response to the message.

In step 905, the base station 910 responds to the determined transmission power with the terminal 920. The base station 910 receiving a request of power allocation for adjusting a beam width of the terminal 920 may allocate a power requested by the terminal 920 and then notify the allocated power to the terminal 920. The base station 910 notifies of the degree of actually allocated power gains to the terminal 920. In step 925, since a gain notified of by the base station 910 is different from a gain requested to the base station 910, the terminal 920 determines how long power supplies of the antenna reception circuits of the terminal 920 are maintained through the gain notified by the base station 910.

For a specific example, a power $P_{adjusted}$ which the terminal can reduce by adjusting a beam width can be calculated as below.

$$P_{adjusted}=\max(P_{current}, P_{ref})-P_{ref} \text{ (dB unit)} \quad \text{Equation 1}$$

where $P_{current}$ may be determined as $-10*\log_{10}$ (a quantized battery level) which is a power corresponding to a current battery level of the terminal, and $P_{ref}$ may be determined as $-10*\log_{10}$ (quantized battery level of a battery threshold) which is a power corresponding to a battery threshold notified of by the base station.

In another example, $P_{adjusted}$ which the terminal can reduce by adjusting a beam width can be calculated as below.

$$P_{adjusted}=\min((\max(P_{current}, P_{ref})-P_{ref}), G_{BS}) \text{(dB unit)} \quad \text{Equation 2}$$

$P_{current}$, $P_{ref}$ is identical to that described in the Equation 1, and $G_{BS}$ indicates a downlink power which is notified of by the base station and can increase.

The terminal can calculate a gain which can be adjusted by Equation 3.

$$G_{antenna\_ratio}=10*\log_{10}(N_{Narrow}/N_{broad\_beam\_control}*\alpha) \quad \text{Equation 3}$$

Where $N_{Narrow}$ indicates the number of antenna elements included in the terminal, $N_{broad\_beam\_control}$ indicates the number of antenna elements operated to use a wide beam, and a indicates a hardware correction value.

The terminal calculates $P_{adjusted}$ which is a power capable of being decreased, determines $G_{antenna\_ratio}$, which is closest to this, as a gain for adjusting a beam width, and determines the number of antenna elements (i.e., the number of antenna reception circuits) operated to use a wide beam according to the determined $G_{antenna\_ratio}$. According to the gain for adjusting the beam width, the terminal generates information to be included in a message to be transmitted to the base station in step 803 or step 903.

As an example, when the number of antenna elements for saving a power consumption and the number of antenna reception circuits according to this are reduced by half, a power which is consumed in the antenna reception circuit unit is saved by 50%, but a 3 dB reception signal loss occurs. Therefore, the terminal may select a CQI for further obtaining a 3 dB gain, thereby reporting the selected CQI to the base station. In other words, the terminal may select a CQI which is lowered by 3 dB in order to obtain a 3 dB additional gain. When the embodiment of FIG. 9 is applied, the terminal may directly request the 3 dB additional gain to the base station.

As another example, when the number of antenna elements for saving a 25% power consumption and the number of antenna reception circuits according to this are reduced by ¾, a $10*\log_{10}(¾)=1.25$ dB reception signal loss occurs. Therefore, the terminal may select a CQI which is lowered by 1.25 dB in order to obtain a 1.25 dB additional gain.

However, since a value corresponding to a loss which is originally intended by quantization of the CQI is not included, a CQI, which is equal to or lower than a compensation for an intended loss and which is as close as possible, can be selected. For example, in order to obtain the 1.25 dB additional gain, a low CQI corresponding to a 1.25 dB gain difference can be selected or a low CQI corresponding to 1.3 dB gain which is larger than the 1.25 dB gain can be selected.

In a selectable embodiment, the base station may provide a low power consumption support according to at least one among the embodiments as described above to only a terminal which is under a low power consumption support contract with a terminal or a service provider.

When the low power consumption support is provided to the terminal which is under a contract with the service provider, the base station may recognize whether the terminal is contracted in an upper layer which is not a physical layer, and support the low power consumption support to only the contracted terminal. In a method of suggestively adjusting a beam width without a feedback, the terminal previously obtains an authentication, thereby being in a state in which a beam width control for the low power consumption can be controlled by itself. In a method of explicitly adjusting a beam width based on the feedback, the base station recognizes a fact that the terminal requests the beam width adjustment support for the low power consumption through the feedback information for adjusting a beam width sent by the terminal. Further, when a corresponding terminal is contracted, the base station can provide the beam width adjustment support.

When the terminal, which can provide the low power consumption support through a contract with the service provider, and a terminal, which is not under contract with a service provider, coexist, the base station may support two kinds of terminals according to a service policy, and assign a priority for allocation of the additional resource to the contracted terminal.

The embodiments describe a battery level of the terminal as a reference by which the terminal requests resources to the base station, but an emergency call, a minimum quality of experience (QoE)/quality of service (QoS), whether the terminal has subscribed an additional service may be used in another embodiment. Further, when multiple terminals simultaneously request a support to the base station, the base station may assign the priority to at least one terminal to support the priority, by considering a power level and a kind of additional service.

Figure 10:
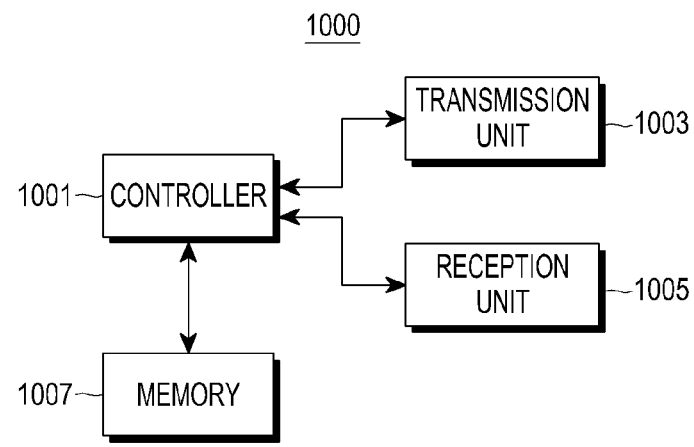
FIG. 10 is a block diagram illustrating an example of a configuration of a base station for supporting a beam width adjustment of a terminal according to an embodiment of the present disclosure.

FIG. 10 is a block diagram illustrating an example of a configuration of a base station for supporting a beam width adjustment of a terminal according to an embodiment of the present disclosure.

A base station 1000 of the present disclosure may include a transmission unit 1003 which transmits a signal to a terminal, a reception unit 1005 which receives a signal from a terminal, a memory 1007 which stores information on a terminal capable of supporting low power consumption according to the present disclosure, and a controller 1001 which controls the transmission unit 1003, the reception unit 1005, and the memory 1007.

It may be understood that the controller 1001 may control all operations of the reception unit 1005, the transmission unit 1003, and the memory 1007 in the present disclosure.

Meanwhile, although FIG. 10 illustrates the transmission unit 1003, the reception unit 1005, the memory 1007 and the controller 1001 as separate or individual configuration units, the reception unit 1005, the memory 1007 and the controller 1001 may also be implemented as an integrated configuration unit.

Figure 11:
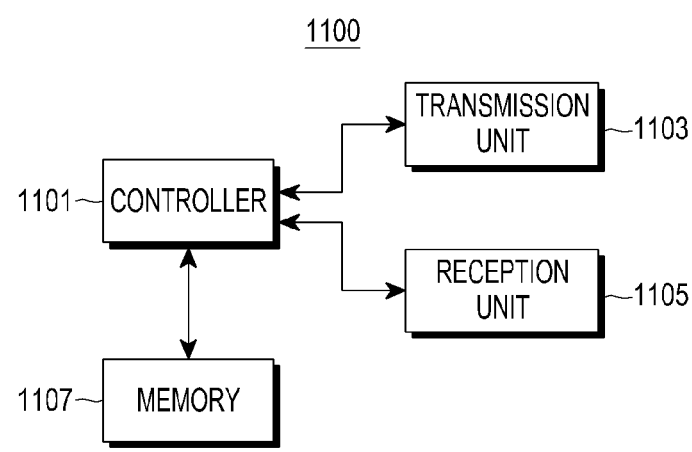
FIG. 11 is a block diagram illustrating an example of a configuration of a terminal for supporting a beam width adjustment according to an embodiment of the present disclosure.

FIG. 11 is a block diagram illustrating an example of a configuration of a terminal for supporting a beam width adjustment according to an embodiment of the present disclosure.

A terminal 1100 of the present disclosure may include a transmission unit 1103 which transmits a signal to a base station, a reception unit 1105 which receives a signal from a base station, a memory 1107 which stores CQI information and information on the terminal 1100 according to the present disclosure, and a controller 1101 which controls the transmission unit 1103, the reception unit 1105, and the memory 1107.

It is understood that the controller 1101 may control all operations of the reception unit 1105, the transmission unit 1103, and the memory 1007 in the present disclosure.

Meanwhile, although FIG. 11 illustrates the transmission unit 1103, the reception unit 1105, the memory 1107 and the controller 1101 as separate or individual configuration units, the transmission unit 1103, the reception unit 1105, the memory 1107 and the controller 1101 may also be implemented as an integrated configuration unit.

It should be noted that a configuration of a reception apparatus having an array antenna according to an embodiment of the present disclosure as shown in FIGS. 1 to 11, resource allocation of a base station to a terminal using a narrow beam width, and the drawings illustrating an example of controlling a reception circuit having the array antenna according to an embodiment of the present disclosure are not intended to limit the scope of the present disclosure. That is, all configurations or steps of the operations illustrated in FIGS. 1 to 11 should not be interpreted as essential structural elements for carrying out the present disclosure, and variations and modifications of the present disclosure may be implemented without departing from the scope of the present disclosure.

The operations as described above may be implemented by including a memory apparatus storing a corresponding program code in a configuration unit in a base station or a terminal apparatus in a communication system. That is, the controller of a smart module or device may perform the above described operations by reading and executing the program code stored in the memory device by means of a processor or a central processing unit (CPU).

The various components of the smart module, device and the like used in the specification may operate by using a hardware circuit, for example, a combination of a complementary metal oxide semiconductor based logical circuit, firmware, software and/or hardware, and a combination of firmware and/or software inserted into a machine-readable medium. For an example, various electronic structure and methods may be performed using transistors, logic gates, electric circuits such as an application specific integrated circuit.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of adjusting a reception beam width of a terminal in a wireless communication system, the method comprising:
    receiving a battery threshold for terminals in a cell from a base station;
    determining whether to use a wider reception beam width than a currently used reception beam width, by comparing a battery level of the terminal with the battery threshold;
    transmitting first resource request information comprising a first channel quality indicator (CQI) corresponding to a reception channel quality related to the base station, when the battery level of the terminal is greater than the battery threshold;
    transmitting second resource request information comprising second CQI when the battery level of the terminal is less than the battery threshold, the second CQI being generated by reducing the first CQI according to an array antenna gain required to the wider reception beam width; and
    when an additional resource corresponding to the second resource request information is allocated by the base station, receiving signals through at least one reception beam having the wider reception beam width, formed by blocking a power supply of at least one antenna reception circuit among multiple antenna reception circuits corresponding to multiple antenna elements,
    wherein the battery threshold is adaptively adjusted by the base station depending on a loading state of the base station, and
    wherein the battery threshold is determined as a first value when the loading state of the base station is high, and the battery threshold is determined as a second value higher than the first value when the loading state of the base station is low.

2. The method of claim 1, wherein the second CQI is generated by:
    calculating the array antenna gain required to convert the currently used reception beam width into the wider reception beam width;
    measuring a signal to noise ratio (SNR) indicating the reception channel quality related to the base station;
    subtracting a value corresponding to the calculated array antenna gain from the measured SNR to determine a target SNR; and
    selecting a CQI corresponding to the target SNR as the second CQI.

3. The method of claim 1, wherein the second resource request information includes at least one among an indicator which indicates that the terminal requests an additional resource, an additional gain value, and an amount of the additional resource.

4. The method of claim 1, further comprising:
    receiving allocation information corresponding to the additional resource from the base station,
    wherein the allocation information includes an additional gain value, modulation and coding scheme (MCS) index, and an amount of the additional resource.

5. The method of claim 1, wherein determining whether to use the wider reception beam width than the currently used reception beam width, comprises performing a determination by considering at least one among the battery level of the terminal, existence or absence of an emergency call, a minimum quality of experience (QoE)/quality of service (QoS), and whether the terminal has subscribed an additional service.

6. A method of supporting an adjustment of a reception beam of a terminal by a base station in a wireless communication system, the method comprising:
    broadcasting a battery threshold for terminals in a cell;
    receiving resource request information from the terminal; and allocating an additional resource to the terminal in response to a reception of the resource request information, wherein the resource request information comprises a first channel quality indicator (CQI) corresponding to a reception channel quality related to the base station, when the terminal determines that the battery level of the terminal is greater than the battery threshold, wherein the resource request information comprises second CQI when the terminal decides that the battery level of the terminal is less than the battery threshold, the second CQI being generated by reducing the first CQI according to an array antenna gain required to the wider reception beam width, wherein the battery threshold is adaptively adjusted by the base station depending on a loading state of the base station, and wherein the battery threshold is determined as a first value when the loading state of the base station is high, and the battery threshold is determined as a second value higher than the first value when the loading state of the base station is low.

7. The method of claim 6, wherein the resource request information includes at least one among an indicator which indicates that the terminal requests an additional resource, an additional gain value, and an amount of the additional resource.

8. The method of claim 6, further comprising:
transmitting allocation information corresponding to the additional resource to the terminal,
wherein the allocation information includes at least one among an additional gain value, a modulation and coding scheme (MCS) index, and an amount of the additional resource.

9. The method of claim 6, wherein the allocating of the additional resource to the terminal comprises determining whether to allocate the additional resource with reference to at least one among existence or absence of an emergency call of the terminal, a quality of service (QoS), a quality of experience (QoE), and whether the terminal has subscribed an additional service, and then allocating the additional resource to the terminal.

10. A terminal apparatus for adjusting a reception beam width in a wireless communication system, the terminal apparatus comprising:
a receiver configured to receive a battery threshold for terminals in a cell from a base station;
a transmitter configured to transmit resource request information to the base station; and
a controller configured to:
determine whether to use a wider reception beam width than a currently used reception beam width, by comparing a battery level of the terminal and the battery threshold,
control the transmitter to transmit first resource request information comprising a first channel quality indicator (CQI) corresponding to a reception channel quality related to the base station, when the battery level of the terminal is greater than the battery threshold,
control the transmitter to transmit second resource request information comprising second CQI when the battery level of the terminal is less than the battery threshold, the second CQI being generated by reducing the first CQI according to an array antenna gain required to the wider reception beam width, and
when an additional resource corresponding to the second resource request information is allocated by the base station, control the receiver to receive signals through at least one reception beam having the wider reception beam width, formed by blocking a power supply of at least one antenna reception circuit among multiple antenna reception circuits corresponding to multiple antenna elements, wherein the battery threshold is adaptively adjusted by the base station depending on a loading state of the base station, and wherein the battery threshold is determined as a first value when the loading state of the base station is high, and the battery threshold is determined as a second value higher than the first value when the loading state of the base station is low.

11. The terminal apparatus of claim 10, wherein the second CQI is generated by:
calculating the array antenna gain required to convert the currently used reception beam width into the wider reception beam width;
measuring a signal to noise ratio (SNR) indicating the reception channel quality related to the base station;
subtracting a value corresponding to the calculated array antenna gain from the measured SNR to determine a target SNR; and
selecting a CQI corresponding to the target SNR as the second CQI.

12. The terminal apparatus of claim 10, wherein the second resource request information includes at least one among an indicator which indicates that the terminal requests an additional resource, an additional gain value, and an amount of the additional resource.

13. The terminal apparatus of claim 10, wherein the receiver is configured to receive allocation information corresponding to the additional resource from the base station and the allocation information includes at least one among an additional gain value, a modulation and coding scheme (MCS) index, and an amount of the additional resource.

14. The terminal apparatus of claim 10, wherein, in determining whether to use the wider reception beam width than the currently used reception beam width, the controller performs a determination by considering at least one among the battery level of the terminal, existence or absence of an emergency call, a minimum quality of experience (QoE)/ quality of service (QoS), and whether the terminal has subscribed an additional service.

15. A base station for supporting an adjustment of a reception beam width of a terminal in a wireless communication system, the base station comprising:
a transmitter configured to broadcast a battery threshold for terminals in a cell;
a receiver configured to receive resource request information from the terminal; and
a controller that allocates an additional resource to the terminal in response to a reception of the resource request information,
wherein the resource request information comprises a first channel quality indicator (CQI) corresponding to a reception channel quality related to the base station, when the terminal determines that the battery level of the terminal is greater than the battery threshold,
wherein the resource request information comprises second CQI when the terminal decides that the battery level of the terminal is less than the battery threshold, the second CQI being generated by reducing the first CQI according to an array antenna gain required to the wider reception beam width, wherein the battery threshold is adaptively adjusted by the base station depending on a loading state of the base station, and wherein the battery threshold is determined as a first value when the loading state of the base station is high, and the battery threshold is determined as a second value higher than the first value when the loading state of the base station is low.

16. The base station of claim 15, wherein the resource request information includes at least one among an indicator which indicates that the terminal requests an additional resource, an additional gain value, and an amount of the additional resource.

17. The base station of claim 15, wherein the transmitter is configured to transmit allocation information corresponding to the additional resource to the terminal and the allocation information includes at least one among an additional gain value, a modulation and coding scheme (MCS) index, and an amount of the additional resource.

18. The base station of claim 15, wherein the controller is configured to determine whether to allocate the additional resource with reference to at least one among existence or absence of an emergency call of the terminal, a quality of service (QoS), a quality of experience (QoE), and whether the terminal has subscribed an additional service, and then allocates the additional resource to the terminal.

* * * * *